(12) United States Patent
Smith, Jr. et al.

(10) Patent No.: US 9,331,352 B2
(45) Date of Patent: May 3, 2016

(54) SULFONATED PERFLUOROCYCLOPENTENYL POLYMERS AND USES THEREOF

(71) Applicant: The Board of Regents of the University of Texas System, Austin, TX (US)

(72) Inventors: Dennis W. Smith, Jr., Dallas, TX (US); Daniel K. Dei, Dallas, TX (US); John P. Ferraris, Coppell, TX (US); Kenneth J. Balkus, Jr., The Colony, TX (US); Inga H. Musselman, Dallas, TX (US); Duck J. Yang, Flower Mound, TX (US); Grace Jones D. Kalaw, Dallas, TX (US); Babloo Sharma, Richardson, TX (US)

(73) Assignee: The Board of Regents of the University of Texas System, Austin, TX (US)

(*) Notice: Subject to any disclaimer, the term of this patent is extended or adjusted under 35 U.S.C. 154(b) by 333 days.

(21) Appl. No.: 13/947,037

(22) Filed: Jul. 20, 2013

(65) Prior Publication Data

US 2014/0162173 A1 Jun. 12, 2014

Related U.S. Application Data

(60) Provisional application No. 61/673,821, filed on Jul. 20, 2012.

(51) Int. Cl.
*C08G 8/02* (2006.01)
*H01M 8/10* (2016.01)
*C25B 13/08* (2006.01)
*C08J 5/22* (2006.01)

(52) U.S. Cl.
CPC ............ *H01M 8/1039* (2013.01); *C08J 5/2262* (2013.01); *C25B 13/08* (2013.01); *H01M 8/1027* (2013.01); *H01M 8/1088* (2013.01); *Y02E 60/523* (2013.01); *Y02P 70/56* (2015.11)

(58) Field of Classification Search
CPC .................... C08G 18/0828; C08G 2261/516; C08G 2261/1452; C08G 2261/722; H01B 1/122; H01M 8/1025
USPC ......................................... 528/125, 373, 370
See application file for complete search history.

(56) References Cited

U.S. PATENT DOCUMENTS 4,990,633 A 2/1991 Negele et al.

OTHER PUBLICATIONS

Sharma et al. (Polymer Preprints (American Chemical Society, Division of Polymer Chemistry) (2011), 52(1), p. 1-2).*
Beale et al., "Copolymers containing perfluorocyclohexene and perfluorocyclopentenes", Journal of Polymer Science, Polymer Letters Edition, 16(2): 67-74, 1978.
Cracowski et al., "Perfluorocyclopentenyl (PFCP) Aryl Ether Polymers via Polycondensation of Octafluorocyclopentene with Bisphenols", Macromolecules, 45(2): 766, 2012.
Kalaw et al., "Perfluorocyclobutyl (PFCB)-based polymer blends for proton exchange membrane fuel cells (PEMFCs)", *J. Membrane Sci.*, 431: 86-95, 2013.

* cited by examiner

*Primary Examiner* — Shane Fang
(74) *Attorney, Agent, or Firm* — Parker Highlander PLLC

(57) ABSTRACT

An aspect of the invention is directed to a polymer comprising a sulfonated perfluorocyclopentyl compound. Another aspect of the invention is directed to a sulfonated copolymer comprising one or more sulfonated polymers. A further aspect of the invention is directed to membranes prepared from the polymers of the claimed invention.

16 Claims, 7 Drawing Sheets ic stability, mechanical resistance and a high ionic conductivity of 0.1 S/cm at 80° C. and fully humidified conditions. Nafion®'s attractive PEM properties result from its well-studied nanophase-separated morphology comprising hydrophilic and hydrophobic domain. Higher temperature operation (≥100° C.) for PEMFCs is advantageous due to faster electrode kinetics of $O_2$ reduction, improved CO tolerance of the catalyst, elimination of cathode side flooding at high current throughput, and reduced radiator size in automobiles. However, utility of Nafion® at higher temperatures and low relative humidity (≤50%) is limited due to the drastic reduction of its proton conductivity resulting from dehydration, its compromised mechanical strength, and its susceptibility to oxidative degradation by peroxide-derived free radicals formed under FC operation. Moreover, the proton-conducting hydrophilic domains in Nafion®'s structure change unpredictably with changes in relative humidity and temperature. Therefore, control of proton conductivity and stability in PEMs are key factors being investigated to obtain robust membranes at high temperature and low relative humidity. The relationship between the proton conductivity and membrane stability often leads to a trade-off, which has become a major problem in PEM development. One approach that has been investigated is the use of well-ordered block copolymers that self-assemble into nanophases. Several copolymer systems, such as sulfonated polysulfone-PVDF, poly(arylene ether sulfone)/(sulfonated polybutadiene), polysulfonated (styrene-butadiene), and sulfonated poly(styrene-isobutylene-styrene), have been reported.

SULFONATED PERFLUOROCYCLOPENTENYL POLYMERS AND USES THEREOF

CROSS-REFERENCES TO RELATED APPLICATIONS

This application claims the benefit of U.S. Provisional Application No. 61/673,821, filed Jul. 20, 2012, which is incorporated by reference as if fully set forth herein.

FIELD OF THE INVENTION

The claimed invention provides methods for the synthesis of sulfonated perfluorocyclic polymers and the sulfonated polymers derived therefrom.

BACKGROUND OF THE INVENTION

Polymers with high levels of fluorine have novel properties including chemical and thermal resistance. The commercialization of proton exchange membrane fuel cells (PEMFCs) has been delayed due to the lack of a highly efficient and durable membrane material that can withstand the harsh fuel cell operating conditions. The current PEM standard is a perfluoroalkylsulfonic acid, Nafion®, which displays chemi- Perfluorocyclic polymers are known to display thermal/oxidative stability, durability, optical transparency, and processability. The facile polymerization through a thermal [2π+2π] cycloaddition of the trifluorovinyloxyether monomers affords the wide applicability of these polymers, including, gas separations and fuel cell membranes. However, with the use of perfluorocyclopentenyl (PFCP) monomer, the production of the resulting hompolymer, copolymer or terpolymer is cheaper than alternate monomers at least in part due to the lack of need of high pressure equipment. Furthermore, handling of PFCP monomer is safer, thereby making the synthesis of the polymer safer as well. Therefore, it would be desirable to sulfonate perfluorocyclic polymers such as PFCP for use in the manufacture of PEM membranes and other desired applications.

SUMMARY OF THE INVENTION

An aspect of the invention is directed to a polymer comprising a sulfonated perfluorocyclopentyl compound.

Another aspect of the invention is directed to a sulfonated copolymer comprising one or more sulfonated polymers.

A further aspect of the invention is directed to membranes prepared from the sulfonated polymers of the claimed invention.

DETAILED DESCRIPTION OF EXEMPLARY EMBODIMENTS

An embodiment of the claimed invention is directed to the sulfonation of semifluorinated polymers such as perfluorocyclic polymers via a post-polymerization sulfonation route. A further embodiment of the invention is directed to the synthesis of sulfonated polymers using sulfonic acid-functionalized monomers. In certain embodiments of the invention, the sulfonated polymers are perfluorocyclopentenyl (PFCP) aromatic ether polymers.

In an embodiment of the invention, sulfonation of polymers is performed using chlorosulfonic acid and thionyl chloride. Another embodiment is directed to the use of sulfonic acid-functionalized monomers in the synthesis of sulfonated polymers.

A further embodiment of the invention is directed to sulfonated PFCP copolymers prepared by the claimed methods.

In an embodiment of the invention, PFCP polymers are synthesized by the process set forth herein. To a dry round bottom flask equipped with a magnetic stirrer, 2.97 mmol of bisphenol, 6.54 mmol of triethylamine and 10 mL of DMF were added. The solution was degassed with nitrogen for 10 min, and 2.97 mmol of octafluorocyclopentene was added via syringe, after which the flask was heated slowly to 80° C. and run for 24 h. Upon completion, the polymer was precipitated in 100 mL of methanol, filtered, washed several times with methanol, and dried under vacuum at 50° C. for 24 h giving a white powder polymer.

In an embodiment of the invention, the molecular weight of the resulting polymer ranges from 20,000 to 200,000. In certain preferred embodiments, the molecular weight of the resulting polymer ranges from 50,000 to 150,000.

Polymerization of the phenoxide salt (sulfonated or non-sulfonated) with octafluorocyclopentene (OFCP) monomer or with precursors is performed at a temperature ranging from room temperature to 100° C. using solvents such as DMF, mesitylene and bases such as triethylamine, sodium hydride, cesium carbonate, dimethylamino pyridine, pyridine. The polymers are precipitated at room temperature with methanol or water, followed by filtration, drying at 70° C. in vacuum.

Figure 1:
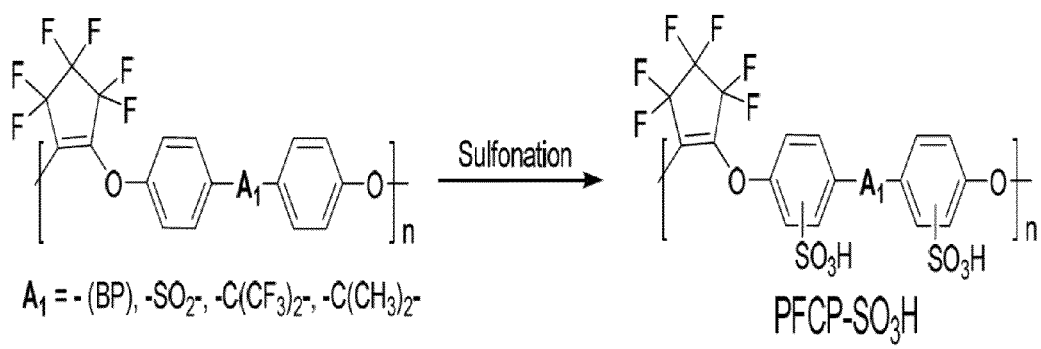
FIG. 1 shows a process for the sulfonation of a PFCP polymer in accordance with an embodiment of the invention.

FIG. 1 shows the sulfonation of a PFCP polymer. As shown in FIG. 1, a solution of PFCP polymer (i.e. BP-PFCP) in 100 mL of dichloromethane is placed in a 250-mL round bottom flask equipped with a dropping funnel and $N_2$ inlet/outlet. Chlorosulfonic acid (48 mmol) is added dropwise at room temperature. After 24 h, thionyl chloride (97 mmol) is added, and the resulting solution is stirred for 2 d at room temperature. To stop the reaction, a cold methanol/ice-water mixture is poured with vigorous stirring into the mixture. The sulfonated polymer is precipitated out at pH~5. The polymer is collected by filtration, washed, and dried at 70° C. under vacuum for 12 h. The application of this procedure can be extended to a variety of other PFCP polymers.

Figure 2A:
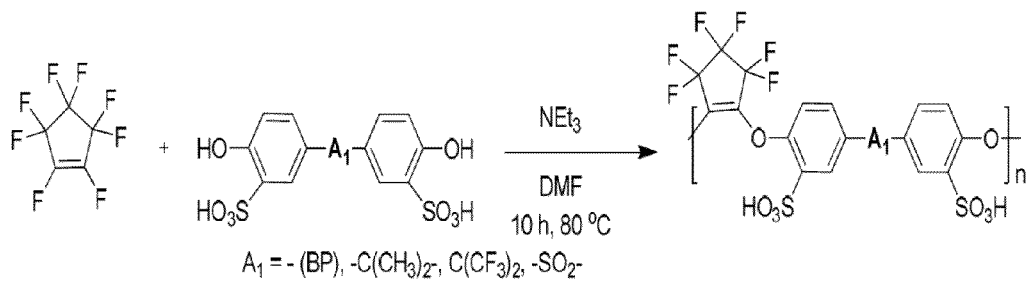
FIG. 2A shows the synthesis for sulfonated PFCP polymers using sulfonated monomers in accordance with an embodiment of the invention.
Figure 2B:
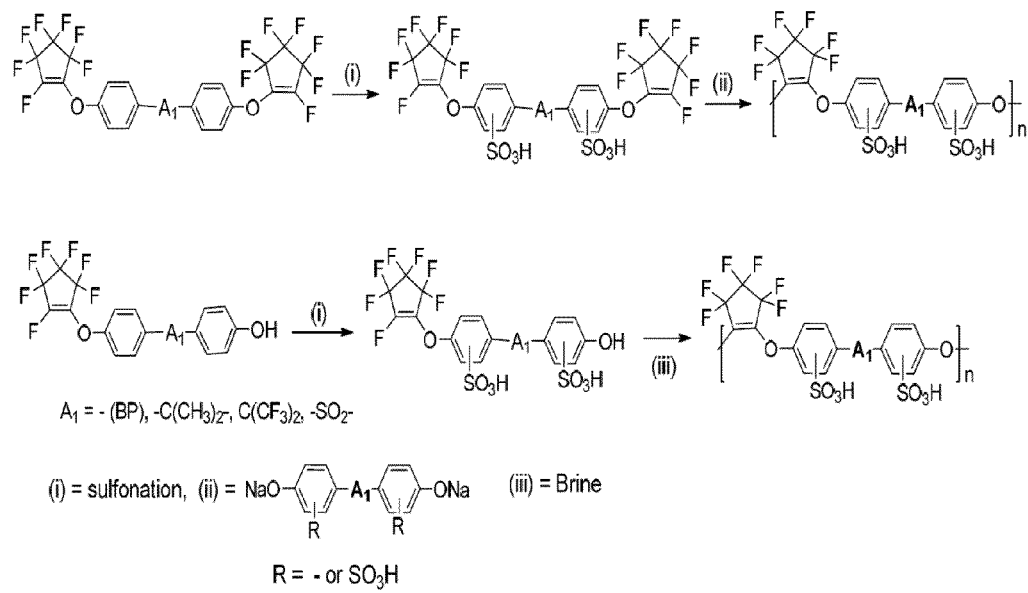
FIG. 2B shows a synthesis process for sulfonated PFCP monomers and polymers in accordance with an embodiment of the invention.

As set forth in FIG. 2A, an alternate method for the synthesis of a sulfonated PFCP involves the use of sulfonic acid-functionalized monomers in the PFCP synthesis. The polymerization of a sulfonated phenol and octafluorocyclopentene (OFCP) form the sulfonated PFCP polymer. The sulfonated bisphenol can be converted to its salt form by washing with brine or the appropriate solution. In the usual polymerization reaction, the sulfonated bisphenol in its salt form is added to DMF in a reaction vessel/flask. The solution is degassed using a nitrogen purge and octafluorocyclopentene is added. The reaction is slowly heated to 80° C. and maintained for 24 h. The resulting polymer is collected by precipitation in methanol, filtered, washed further with methanol, and dried under vacuum at 50° C. for 24 h. The sulfonate salt is converted to the sulfonic acid by washing the polymer with water and hydrochloric acid. This strategy can be expanded to encompass a wide range of sulfonated bisphenols and potentially other dinucleophilic monomers (FIG. 2B).

Figure 3:
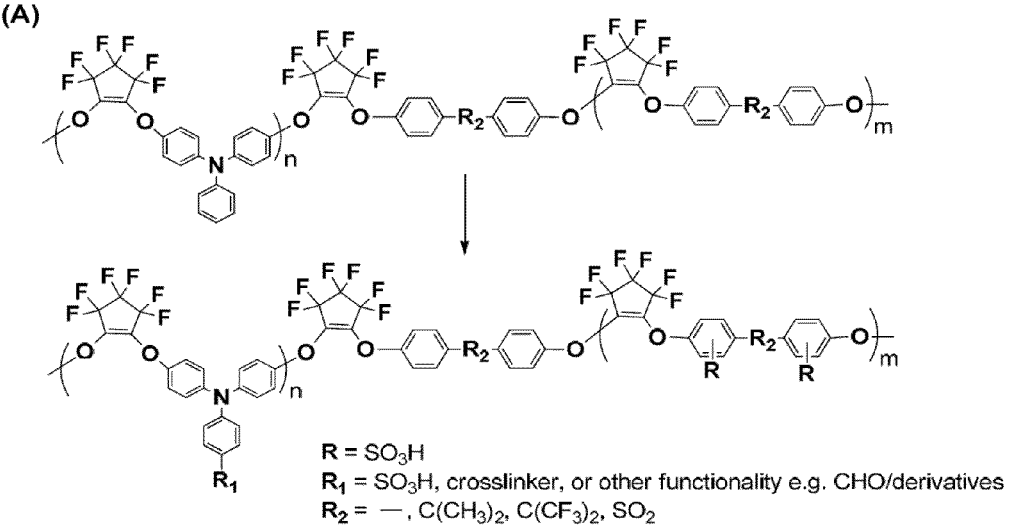
FIGS. 3A and 3B show PFCP copolymers with high sulfonation, chain functionalization and cross-linking potential in accordance with an embodiment of the invention.
Figure 3:
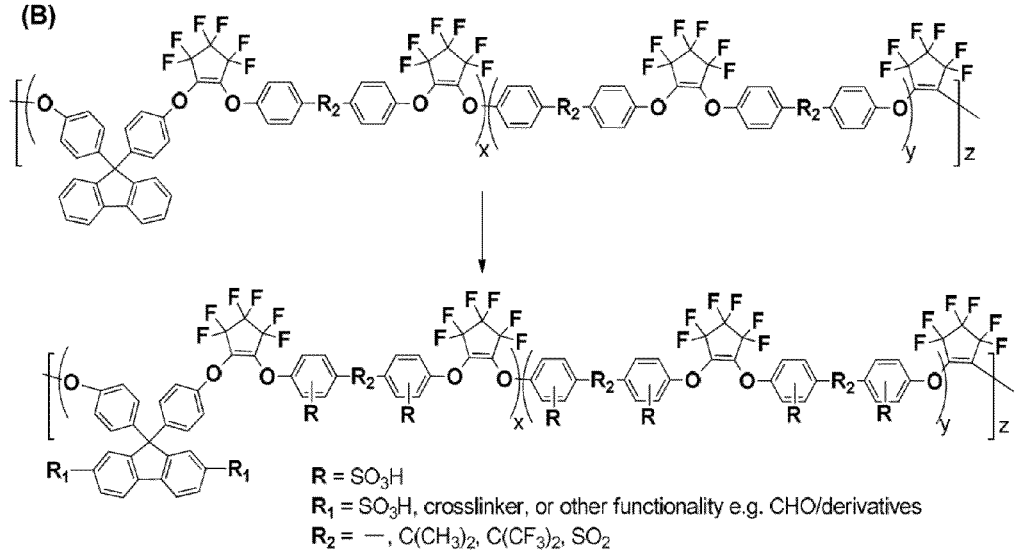

An embodiment of the invention is directed to PFCP copolymers with excellent thermal stability, processability, chain modification and cross-linking potential. FIG. 3A shows the structure of a triarylamine copolymer with a PFCP biphenyl. The biphenyl groups are sulfonated for the PEMs (proton exchange membranes) as indicated by the R groups, while $R_2$ serves as spacer groups depending on the desired properties. Additionally, the triarylamine pendant chain can be functionalized. Facile substitution at the $R_1$ position provides synthetic flexibility for sulfonation or the addition of a crosslinker. This is an advancement over PEMs for fuel cells without crosslinking ability. The process is expected to reduce membrane swelling, a well anticipated advantage over non-crosslinkable membranes. The copolymer shown in FIG. 3B has similar properties with functionalization on the biphenyl (sulfonation), as well as on the fluorene pendant chain, which can induce cross-linking.

The sulfonated PFCP polymer of the claimed invention can be dissolved in aprotic, polar solvents such as DMSO at a 5-10 wt % solution. In certain embodiments of the invention, the sulfonated PFCP polymers are prepared as a film by solution casting onto a Teflon® substrate using a doctor blade and an automatic film applicator. The wet film is dried under vacuum following a temperature ramp with a final annealing at 180° C. for 24 h. The film is kept in an environment with controlled humidity until testing and characterization. The films are soaked in a HCl/water solution for at least 12 h to ensure that all sulfonic acid groups are acidified.

Polymer blends of sulfonated and unsulfonated PFCP polymers are prepared in different mole ratios (10:90, 20:80, 30:70, 50:50, 70:30, 80:20, 10:90). Each polymer is first dissolved (5-10 wt %) separately in the same solvent (i.e. DMSO) and stirred overnight to ensure dissolution. The polymers are then combined, stirred, and subjected to acoustic mixing at 20% power for 20 min. The resulting polymer blends are then cast as previously described.

Block copolymers of sulfonated and unsulfonated PFCP polymers are cast as films using a procedure similar to that for pure sulfonated PFCP polymers.

In certain embodiments, electrospun fibers of the sulfonated PFCP polymer, embedded in a polymer blend matrix are prepared using the following procedure: The sulfonated PFCP polymer is first electrospun into a nonwoven mat of fibers. These fibers are then placed on a Teflon® substrate. With the aid of a doctor blade (set at a height higher than the fiber mat thickness), a polymer blend solution of the sulfonated and unsulfonated PFCP is cast on the fibers using an automatic film applicator. The same film drying conditions as previously described are followed for this system.

An important application for sulfonated PFCP polymers is their use as proton exchange membranes for fuel cells. Due to the ease of sulfonation of the aromatic rings in PFCP polymers, a high degree of acidity is obtained upon their sulfonation. This acidity or hydrophilicity translates to increased ion exchange capacity and proton conductivity greater than or close to that of the current widely used PEM material, Nafion® (IEC 0.91 meg/g, σ0.1 S/cm at 80° C., ≤50% R. H., respectively). Several systems based on the sulfonated PFCP polymer for PEM materials are listed below:

1. Pure Sulfonated PFCP Homopolymers

Figure 4:
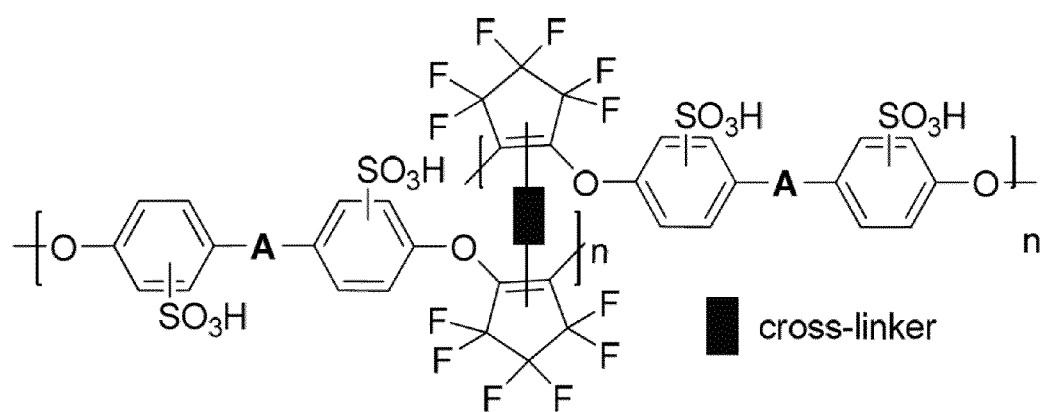
FIG. 4 illustrates the cross-linking of sulfonated PFCP polymers in accordance with an embodiment of the invention.

The extent of sulfonation is highly controllable for semi-fluorinated materials (i.e. PFCB polymers). To obtain high proton conductivities greater than 0.1 S/cm, the PFCP polymer is highly sulfonated without sacrificing membrane mechanical stability. To overcome membrane swelling issues, the sulfonated PFCP polymer was crosslinked via the reactive fluorinated vinyl groups (FIG. 4). This approach of using a highly sulfonated PFCP homopolymer increased proton conductivity (≥0.10 S/cm).

2. Blends of Sulfonated and Unsulfonated PFCP Homopolymers

To mimic Nafion®'s nanophase-separated morphology, sulfonated and unsulfonated PFCP homopolymers were combined in polymer blends with different moles ratios. Their combination provides the high proton conductivity of the highly acidic hydrophilic PFCP polymer and the high mechanical stability of the hydrophobic PFCP polymer in the PEM. To further improve the PEM performance and lifetime, the PFCP-based blends were crosslinked as previously described.

3. Block Copolymers of Sulfonated and Unsulfonated PFCP Polymers in Different Mole Ratios Due to the ease of chemistry and nature of polymerization of PFCP, PFCP block copolymers were synthesized in different block ratios of sulfonated (or hydrophilic) and pure (or hydrophobic) PFCP homopolymers. Similar to blends, these block copolymers provided high proton conductivity without compromising the membrane mechanical integrity. Without crosslinking, these block copolymers are expected to be significantly more stable than polymer blends at prolonged fuel cell testing conditions (80° C., ≥50 R. H.). This strategy increased membrane proton conductivity, performance and lifetime.

4. Electrospun Fibers of Sulfonated PFCP Embedded in a Polymer Blend Matrix of the Sulfonated and Unsulfonated PFCP The sulfonated PFCP polymer was electrospun into a nonwoven mat of fibers. These fibers were then placed in a polymer blend solution of the sulfonated and unsulfonated PFCP. A distinct advantage of these electrospun sulfonated PFCP (hydrophilic) nanofibers in nanophase-separated matrices over pure block copolymer membranes is the lack of need for physical control over the domain sizes. Rather than using blocks, domain sizes are controlled by adjusting the fiber diameter and density. The proton transport is easier via the acidic sites along the fiber and in the matrix, without sacrificing the integrity of the membrane. This strategy significantly increased PEM fuel cell performance and lifetime.

The polymer membranes of the claimed invention possess a higher IEC and greater chemical and thermal stability relative to currently existing alternatives. Due to the inexpensive cost of production and synthesis, the membranes of the claimed invention lend themselves to commercialization for fuel cell production.

Working Examples

Synthesis of PFCP-BP Homopolymer

Figure 5:
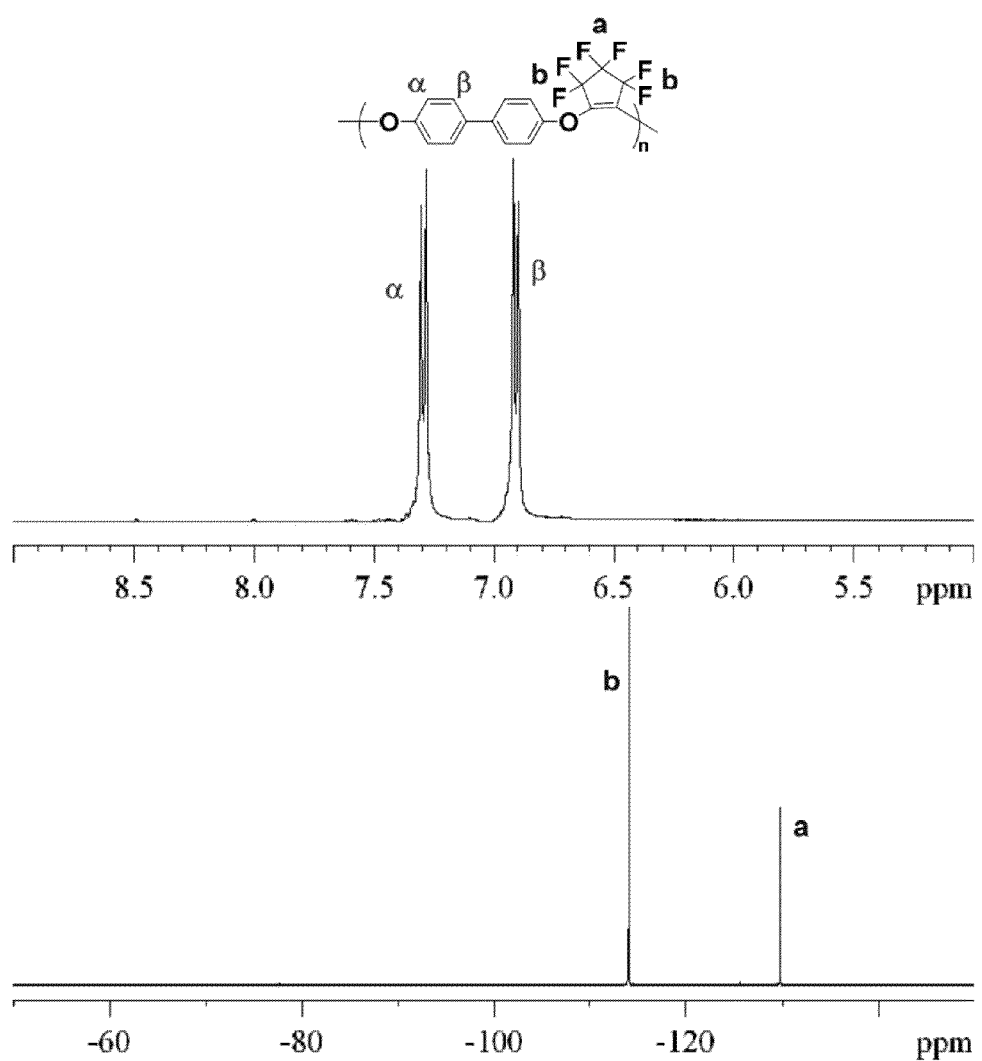
FIG. 5 shows the $^1$HNMR (top) and $^{19}$F NMR (bottom) spectra for a PFCP-BP aryl ether homopolymer in accordance with an embodiment of the invention.
Figure 6:
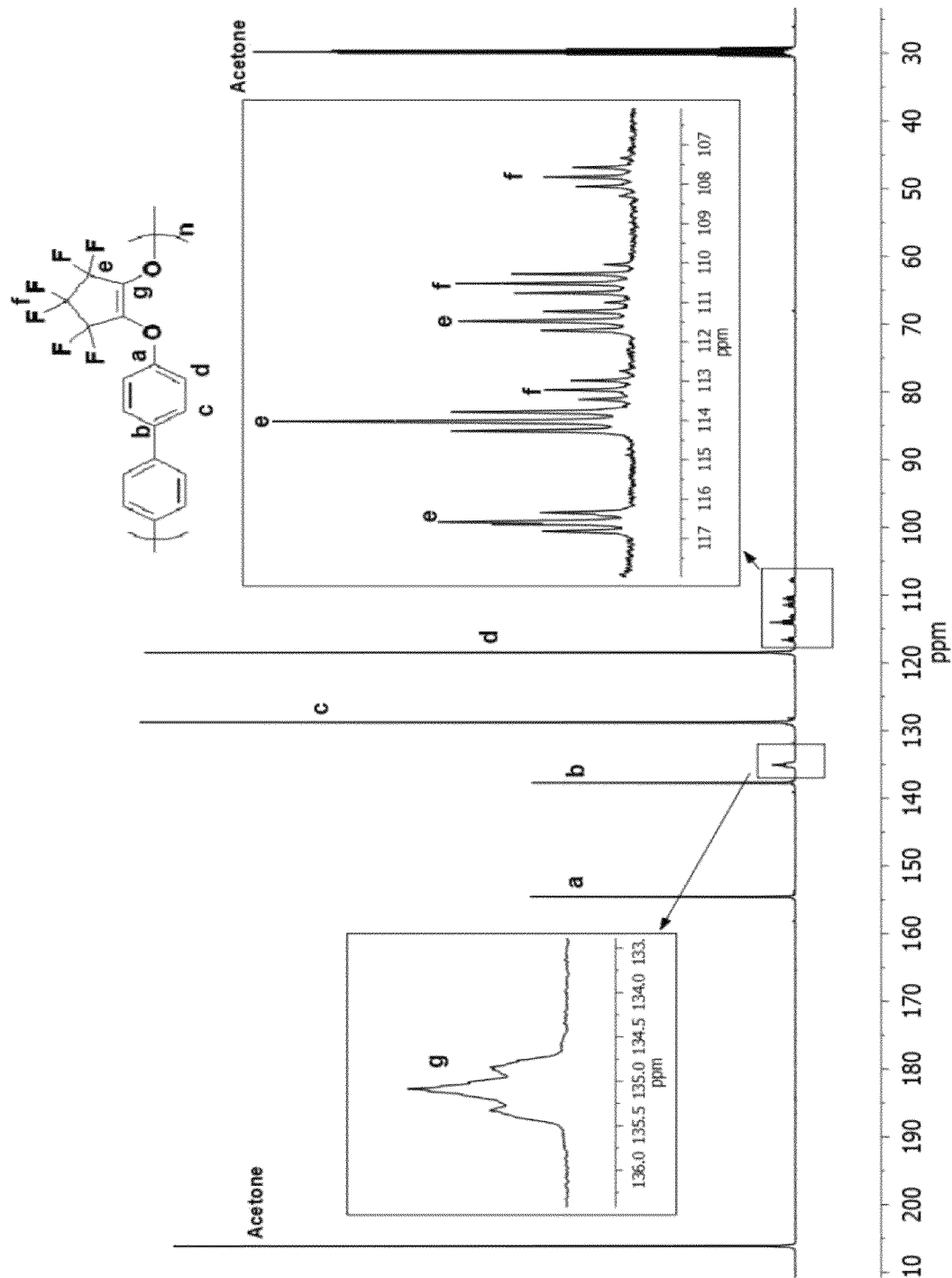
FIG. 6 shows the $^{13}$C NMR spectrum for a PFCP-BP aryl ether homopolymer in accordance with an embodiment of the invention.

In a 25 mL Schlenk tube equipped with a magnetic stirrer was added 2.97 mmol of Biphenol, 6.54 mmol of triethylamine and 2 mL of DMF. The solution was degassed with nitrogen for 10 min and 2.97 mmol of octafluorocyclopentene was added via syringe and the Schlenk flask was heated slowly to 80° C. for 24 h. The polymer was then precipitated in 100 mL of methanol, filtered, washed several time with methanol and dried under vacuum at 50° C. for 24 h giving a white powder (yield=50%). FIG. 5 shows the $^1$HNMR (top) and $^{19}$F NMR (bottom) spectra for a PFCP-BP aryl ether homopolymer. FIG. 6 shows the $^{13}$C NMR spectrum for a PFCP-BP aryl ether homopolymer. The NMR values obtained were: $^1$H NMR (400 MHz, acetone-$d_6$, δ): 6.92 (dm, $^3J_{H-2(H-1)}$=8.58 Hz, 4H), 7.31 (dm, $^3J_{H-1(H-2)}$=8.58 Hz, 4H); $^{19}$F NMR (376 MHz, acetone-$d_6$, δ): −113.89 (4F), −129.60 (2F); $^{13}$C NMR (100 MHz, acetone-$d_6$, δ): 110.5 (PFCP, $CF_2$), 114.0 (PFCP, $CF_2$), 118.5, 128.8, 135.0 (PFCP, C=C), 137.7, 154.5. FTIR (ν, cm-1) data obtained was as follows: 3151 and 3070 (H—C=C), 2941 (C—H), 1729 (C=C), 1270 (C—O), 1150 (C—F), 780 and 653 (C—F). The molecular weight of the homopolymer obtained in this process was 29,800.

Sulfonation of PFCP-BP Homopolymer

Figure 7:
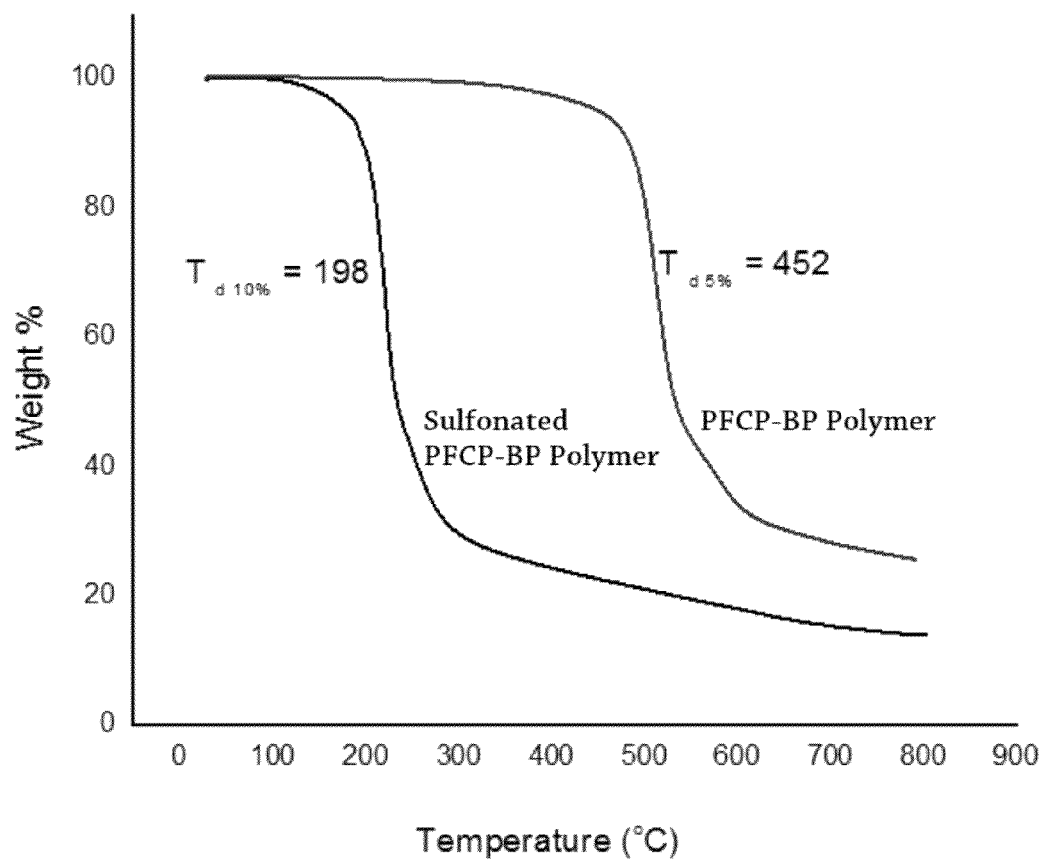
FIG. 7 shows the comparative TGA thermograms of a PFCP-BP polymer before and after sulfonation in accordance with an embodiment of the invention.

PFCP-BP polymer was sulfonated using chlorosulfonic acid and thionyl chloride. PFCP-BP copolymer (3.0 g, 9 mmol) and dichloromethane (100 mL) were placed in a 250-mL round bottom flask equipped with a dropping funnel and N2 inlet/outlet. Chlorosulfonic acid (28 mL, 430 mmol) was added dropwise at room temperature. After 24 h, thionyl chloride (61 mL, 870 mmol) was added, and the resulting solution was stirred for 2 days at room temperature. The reaction was terminated by the slow addition of a cold methanol/ice-water mixture accompanied by vigorous stirring. The sulfonated PFCP-BP polymer precipitated out around pH 5. The polymer was collected by filtration and washed several times with water until the washings were neutral. The resulting yellow polymer obtained was dried at 60° C. under vacuum for 12 hrs. (yield: 81%). FIG. 7 shows the comparative TGA thermograms of a PFCP-BP polymer before and after sulfonation in accordance with an embodiment of the invention.

What is claimed is:

1. A polymer, wherein the polymer comprises a sulfonated perfluorocyclopentyl compound.

2. The polymer of claim 1, wherein the sulfonated perfluorocyclopentyl compound is selected from:

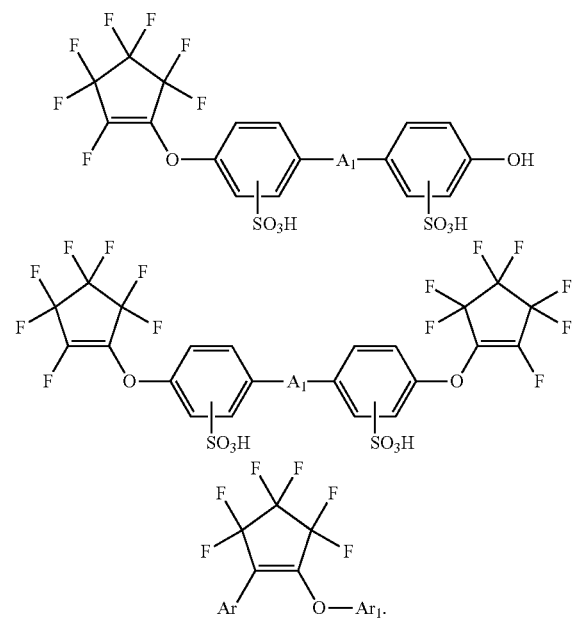

$A_1 =$ —$C(CH_3)_2$—, $C(CF_3)_2$, —$SO_2$—, or a covalent bond;
$Ar = F$, or —O—$Ar_1$:
$Ar_1$ = sulfonated phenols of phenyl, biphenyl, triphenyl, triarylamine, or fluorene.

3. The polymer of claim 1, wherein the sulfonated perfluorocyclopentenyl compound is synthesized by the reaction:

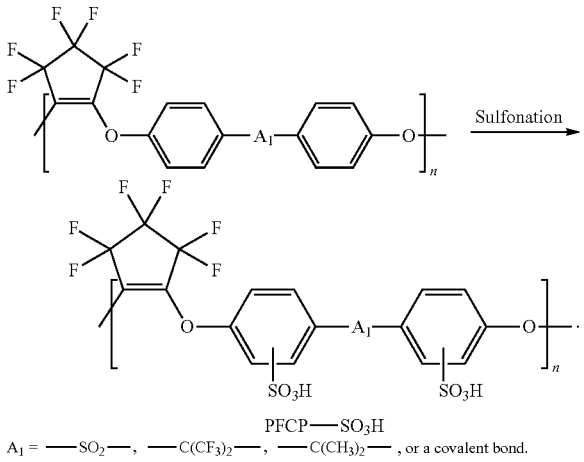

$A_1 =$ —$SO_2$—, —$C(CF_3)_2$—, —$C(CH_3)_2$—, or a covalent bond.

4. The polymer of claim 1, wherein the sulfonated perfluorocyclopentenyl compound is synthesized by the reaction:

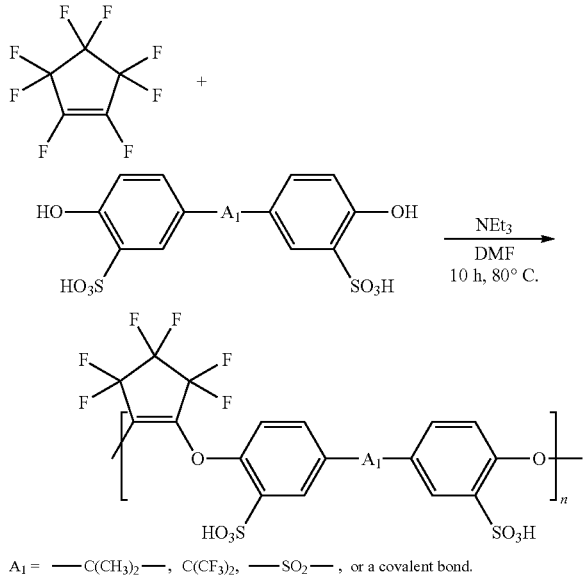

$A_1 = $ —C(CH$_3$)$_2$—, C(CF$_3$)$_2$, —SO$_2$—, or a covalent bond.

5. The polymer of claim 1, wherein the polymer comprises a copolymer comprising:

Block A

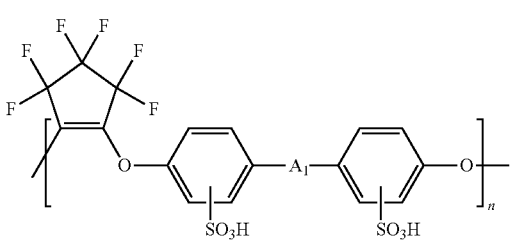

Block B

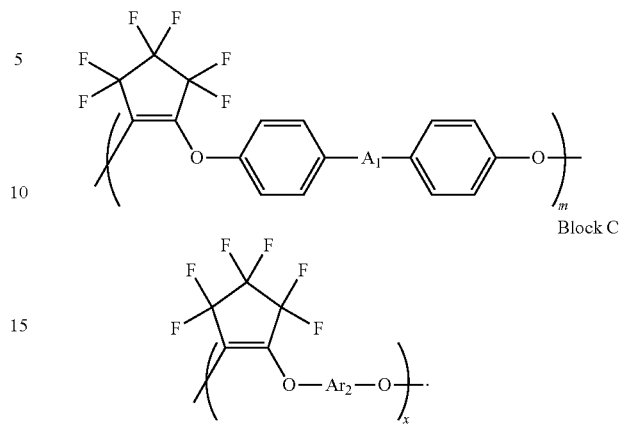

Block C

Ar$_2$ = sulfonated or nonsulfonated phenyl, biphenyl, triphenyl, triarylamine, fluorene.

6. The polymer of claim 5, wherein the copolymer is a homopolymer.

7. The polymer of claim 5, wherein the copolymer is a heteropolymer.

8. The polymer of claim 5, wherein the copolymer is sulfonated.

9. The polymer of claim 1 wherein said polymer has a molecular weight ranging from 20,000 to 200,000.

10. The polymer of claim 9 wherein said polymer has a molecular weight ranging from 50,000 to 150,000.

11. A membrane comprising the polymer of claim 1.

12. The membrane of claim 11, wherein the membrane further comprises a non-sulfonated perfluorocyclopentenyl compound.

13. The membrane of claim 11, wherein the membrane comprises e-spun fibers comprising the polymer of claim 1.

14. The membrane of claim 11, wherein the membrane is extruded from a powder form of the polymer.

15. The membrane of claim 11, wherein the membrane is prepared by wetting a mat of e-spun fibers.

16. The membrane of claim 11, wherein the membrane is used in fuel cells, ion exchange resins, and for electrolysis applications.

* * * * *